J. V. V. Booraem,
Pump Valve.
No. 113,248.  Patented Apr. 4, 1871.
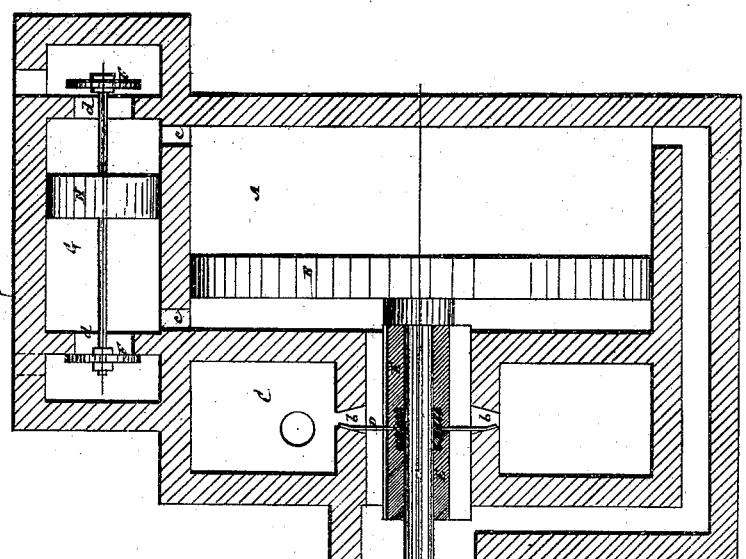
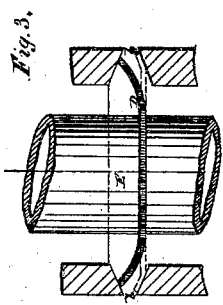
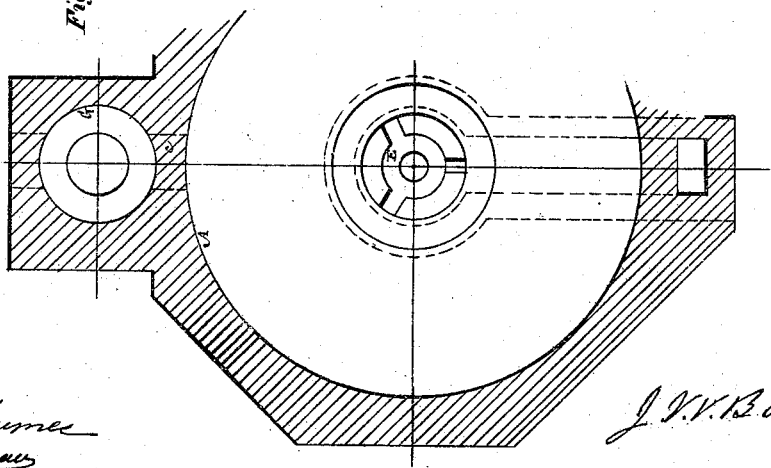
Witnesses
Fred. Haines
R. A. Laveau
J. V. V. Booraem

United States Patent Office.

JOHN V. V. BOORAEM, OF JERSEY CITY, NEW JERSEY.

Letters Patent No. 113,248, dated April 4, 1871; antedated March 23, 1871.

IMPROVEMENT IN VALVES FOR STEAM-PUMPS.

The Schedule referred to in these Letters Patent and making part of the same.

*To all whom it may concern:*

Be it known that I, JOHN V. V. BOORAEM, of Jersey City, in the county of Hudson and State of New Jersey, have invented a new and useful Improvement in Valves for Steam-Pumps, Meters, and other purposes, of which the following is a full, clear, and exact description, reference being had to the accompanying drawing forming part of this specification, and in which—

Figure 1 represents a sectional view, taken longitudinally through the working cylinder of a steam-pump or fluid-meter, with my improved valve applied to the eduction-ports thereof;

Figure 2, a sectional view, taken transversely through said cylinder, of the one-half or portion thereof; and Figure 3, a view of an induction-valve, which may be used in connection with my improved valve, when arranged to control the eduction-ports of the apparatus.

Similar letters of reference indicate corresponding parts.

My invention consists in a valve, having connected with it a piston or diaphragm of such relative proportions to the valve, and the two so arranged in relation to ports or passages through which the gas, vapor, or fluid controlled by the valve is made to pass, that pressure of the actuating medium on the one face of the piston is made to close the valve, and keep it closed till relieved by a counteracting pressure of said medium on the opposite side of the piston, when the valve is free to open under the pressure of the gas, vapor, or fluid upon it.

A valve thus constructed and operating may be used both for induction and eduction purposes, in connection with various reciprocating piston devices, including steam-pumps and fluid-meters, and is automatic in its action.

The same may be made either single or double; that is, either a single valve, controlled by a diaphragm or piston, as described, or two valves be connected to work in unison, to open and close alternately, which is the arrangement shown in the accompanying drawing, in which my improvement is represented as an eduction-valve, applied to a steam-pump or fluid-meter.

Referring to the accompanying drawing—

A represents the working-cylinder of a steam-pump or fluid-meter, and

B its piston; or a flexible diaphragm fastened down on its edges, and capable of play in opposite directions, may be substituted for the piston.

C is an outside inlet-chamber, to which the fluid is freely admitted at all times, and from which it is passed alternately to opposite ends of the cylinder A by the action of a valve, D, arranged to control an inlet opening, b.

This valve, which is made the subject of a separate application for Letters Patent, is of a flexible and elastic character, and is carried by a sliding hub, E, that is operated by the piston B toward the close of its stroke, so as to throw the valve to opposite sides of the opening b, which connects by suitable passages round the hub, and a passage outside of the cylinder, with the opposite ends of the latter.

Such reversed positions of said induction-valve, which it is unnecessary here to further describe, as any other suitable induction-valve or valves may be used, reverses the action of the piston B.

To control the egress of the fluid through the eduction-ports c c of the cylinder, it is obvious that mere check-valves, opening outward, would not answer, inasmuch as the incoming fluid would lift them and flow out of the cylinder without operating the piston.

To obviate this, and to secure an automatic action of the eduction-valve or valves, I use two check-valves F F, connected by a rod, e, so that when the one valve is opened the other is closed, said valves being arranged to control ports d d of a valve-box, G, which is in communication with the ports c c, and said valves connected with an intermediate piston, H; or it may be a flexible diaphragm, within the valve-box, and of greater area than the valves F F.

Thus the incoming fluid to the cylinder A is free to pass out through either one of the ports c, which is in communication with the receiving end of the cylinder; but as said fluid thus passing into the valve-box acts with greater force on the piston H than it does on the one valve F exposed to it, such valve is kept closed, while the other F is open to allow of spent fluid passing from the opposite end of the cylinder into and out of the valve-box through the eduction-ports c d of the open valve F.

On the piston completing its stroke in the one direction, the action of the eduction-valves is reversed, the rush of incoming fluid at the opposite end of the cylinder acting by impact and pressure on the reverse side of the piston H to start the valves F F, when the pressure on the opening valve will readily establish such relief to the piston H as to insure a changed position of the valves.

I do not restrict myself to any particular form of valve, nor precise arrangement of ports, and instead of the valves F F being connected to each other and to a piston or flexible diaphragm common to both, they may be disconnected and each be provided with a separate piston or diaphragm, H; also separate pistons B, similarly restricted as regards exposure to the fluid, may be used.

Such modification is a mere duplication of the devices here shown, and, in view of the pistons B and H, represented in the drawing, being exposed alternately on their opposite faces to the incoming fluid, they each virtually form two pistons.

What is here claimed, and desired to be secured by Letters Patent, is—

A valve, having combined with it a piston or diaphragm, substantially as herein described, and operating by differential pressure on the one side or face of the piston to close the valve, and allowing of the valve to open when pressure is established on both sides of the piston, as specified,

J. V. V. BOORAEM.

Witnesses:
FRED. HAYNES,
R. E. RABEAU.